Patented Dec. 8, 1936

2,063,302

UNITED STATES PATENT OFFICE 2,063,302

OXIDATION CATALYST AND METHOD OF MAKING THE SAME

James F. Eversole, Charleston, W. Va., assignor, by mesne assignments, to Union Carbide and Carbon Corporation, a corporation of New York No Drawing. Application April 9, 1932, Serial No. 604,356

7 Claims. (Cl. 23—234)

The invention relates to improved catalysts for use in the catalytic oxidation of carbon monoxide, and includes a process for making the new catalysts.

Catalysts for use in the oxidation of carbon monoxide to carbon dioxide are commonly composed principally of iron and iron compounds together with more or less inert materials and various so-called activators or promoting agents, which are usually difficultly reducible metal oxides. The usual and known methods for preparing such catalysts comprise forming a solution of ferric nitrate, precipitating ferric hydrate with magnesium oxide, adding a small amount of potassium chromate, drying the mixture produced, and igniting the dried mass to form the oxides, i. e. $Fe_2O_3$, MgO, $Cr_2O_3$ and $K_2O$. The ignited oxides are then formed into pellets of convenient size and shape and are reduced as completely as possible at about the minimum operating temperature of the process in which the catalyst is to be used, generally at about 400° C. The finished catalyst prepared as described before reduction may be composed of about 25% to 35% $Fe_2O_3$, 65% to 75% MgO, and less than 1% $Cr_2O_3$ and $K_2O$.

The preparation and use of a catalyst prepared as described present many difficulties. For example, the material is difficult to form into uniform coherent pellets which will retain their shape. This is a consideration of major importance in the catalytic oxidation of carbon monoxide since in the operation of the process gas distribution over the catalyst, hence the efficacy of the catalytic action, is obtained by its passage through a bed of sized catalyst pellets. Channeling, uneven operation and poor oxidation results if the bed of pellets is not firm and free from dust and disintegrated catalyst pellets. Another difficulty of the same nature may result from the manner in which the catalyst is reduced. It is true that if the catalyst is reduced at or heated prior to use to temperatures above the maximum operating temperature, viz. about 725° C., its activity will be greatly decreased. For this reason it has been generally conceded by those skilled in the art that the reduction of the catalysts should take place at temperatures as far below this maximum temperature as possible. I have found by test that catalysts consisting of perfect pellets when reduced at the low temperatures generally used did not operate satisfactorily. The catalyst beds became channeled, and were found to contain large quantities of fine dust formed by the disintegration of the catalyst pellets after reduction. Other tests proved that reduction of the catalyst at low temperatures caused the pellets, which were originally firm and hard, to swell and disintegrate. This effect was observed to occur erratically and inconsistently throughout a mass of pellets, but always took place to a certain extent.

My invention largely avoids the foregoing difficulties, and has for its principal object the provision of an improved catalyst, and includes a method of making the same.

The process of the invention broadly comprises forming a catalyst base containing MgO, $Fe_2O_3$ and $Cr_2O_3$, and mixing the base with a mineral binding agent which does not glaze or seal the catalyst or otherwise prevent active contact of the catalyst or its ingredients and a gas phase, such as the materials to be reacted. An example of such a binding agent is sodium silicate. The catalyst base mixed with the binder is then formed into pellets which are reduced at temperatures but little below the maximum operating temperature of the catalyst. The reduced catalyst so prepared is very active chemically and very strong mechanically.

A method of practicing the invention is shown by the following example:

Ferric nitrate was prepared by dissolving iron scrap in nitric acid. This was then made into a solution containing about 13 parts of iron per 100 parts of solution by weight. One hundred and sixty parts by weight of a magnesite ore containing about 95% of magnesium carbonate, and about 1 part by weight of potassium chromate were slowly added to 200 parts by weight of the ferric nitrate solution. During this addition the solution was maintained below 25° C. and the materials were thoroughly agitated. The resulting mixture was a thick pasty mass of smooth consistency. I have found that it is essential to keep the solution cooled during the addition of the magnesium carbonate to prevent the formation of lumps and too rapid precipitation of the ferric hydrate. For the same reason magnesite ore or magnesium carbonate is preferable to magnesium oxide, which is more reactive. When all of the magnesite had been added and the reaction at 25° had subsided, the temperature was cautiously raised to force the reaction slowly to completion. The mud became very heavy in the latter stages and the gases evolved escaped with difficulty.

The finished paste was then dried at 250° C. and calcined at about 700° to 750° C. The mixture should be calcined until the loss on ignition at 700° C. is less than 2.0%. The ignited oxides were then crushed to pass about 10 mesh. The crushed material was moistened with a solution of sodium silicate having a specific gravity of about 42° Bé., and containing about 39% of solids composed of $SiO_2$ and $Na_2O$ in the ratio of 3.25 to 1. The sodium silicate solution was added to the crushed oxides in the proportions of about 50 parts by weight of the sodium silicate solution and 4 parts by weight of water to 100 parts by weight of the oxides. After air drying, the mixture while still moist was formed into pellets by a punch and die tablet press.

The finished pellets were then dried at 150° C. for 8 hours, and at 600° C. for a short period of time. In this drying operation careful regulation of the temperatures is essential. Temperatures up to about 300° C. may be used, but temperatures between 350° and 500° C. seriously affect the catalyst causing it to become weak. Therefore, the heating to 600° C. must be done rapidly to avoid this detrimental effect of temperatures between 350° and 500° C., and between 400° and 450° C. in particular. The optimum drying temperatures have been found to be between about 625° and 650° C., but in no case should the pellets be heated to over 725° C.

The pellets so produced were mechanically strong and withstood all ordinary handling and shipping without crumbling or breaking.

Before use the catalyst must be reduced. This is conveniently accomplished by placing a charge of the catalyst pellets in the converter or equipment wherein the catalytic process is to be conducted. The charge may be heated with hot gases and reduced with a gas mixture containing CO.

In a particular case a charge of catalyst pellets was placed in a converter and heated as rapidly as possible to about 660° C. A stream of CO was then admitted to the converter to which heat was no longer supplied. The CO was diluted with $CO_2$, although other inert gases may be used instead of $CO_2$, and the amount of CO in the mixture was regulated during the reduction of the catalyst to hold the temperature substantially constant, and to prevent undue increase in temperature due to the heat of reaction. Within a few hours the catalyst changed color from dull red to black and assumed its reduced active state. The reduced catalyst was very hard and strong, resembling a metallic or refractory ceramic material in strength and appearance. The finished reduced catalyst was very active as an oxidizing agent.

In oxidation tests, a portion of the catalyst described was used to oxidize CO to $CO_2$ over a period of 3 days. Gas containing about 76% CO, 11% $H_2$, 4.5% $CO_2$ and 8.5% inerts, all by volume, together with 3 volumes of steam for each volume of gas was passed through the catalyst at temperatures ranging from 540° to 725° C. The inert constituents of this gas consist of 0.5% to 2.0% by volume of methane, the remainder being nitrogen. The gases also carried traces of coal distillation products. The inert constituents carried through the oxidation process are substantially unchanged so that any change in percentage of inerts appearing is due to the increase in volume of gas in the oxidation reaction. From the equation of this reaction, $CO + H_2O = CO_2 + H_2$, and from gas analyses shown it becomes apparent that this increase in volume amounts to about 30% of the volume of inlet gas. The outlet gases at the two temperatures given had the following compositions:

| Temperature | Percent $CO_2$ | Percent $O_2$ | Percent $H_2$ | Percent CO | Percent inert |
|---|---|---|---|---|---|
| °C. | | | | | |
| 540 | 38.8 | 0.0 | 41.8 | 11.8 | 7.6 |
| 725 | 42.2 | 0.0 | 43.8 | 8.5 | 5.5 |

The space velocity of these experiments was 825 volumes of gas per volume of catalyst per hour. The conversions were better at lower space velocities.

The above two temperatures substantially represent the two extreme temperatures of practical operation with an inlet gas of a composition similar to the one described and with a similar degree of conversion. Under certain conditions the gas mixture described may be oxidized to the extent given at temperatures as low as 525° C., and gas containing less CO may be similarly oxidized at lower temperatures. At the end of the three day test described the catalyst was found to be in as good mechanical condition as it was when freshly prepared. I have found that a catalyst such as the one described will possess good chemical activity, and will remain in good physical condition for twelve months or longer in continuous service.

The catalyst of my invention unlike many similar catalysts is not poisoned or detrimentally affected by sulfur or sulfur compounds, but in fact, may be used to decompose complex sulfur compounds producing hydrogen sulfide without being impaired.

The process as described may be varied within certain limits. For example, the chemical constitution of the catalyst may be from about 25% to about 35% $Fe_2O_3$, about 55% to about 65% MgO, and about 1% $Cr_2O_3$ and $K_2O$ before reduction. The temperature at which the reduction is conducted may vary from about 550° C. to about 725° C., but a temperature of about 660° C. is preferred.

I claim:—

1. A process for making oxidation catalysts which comprises preparing a dry mixture of iron, magnesium, and chromium oxides, crushing the mixed oxides, moistening the crushed oxides with a solution of sodium silicate, forming the moistened oxides into shaped pellets, drying the pellets at temperatures between 500° and 725° C., and heating the pellets as rapidly as possible between the temperatures of 350° and 500° C. to avoid as far as possible subjecting the pellets to prolonged heating at temperatures between 350° and 500° C., and thereafter reducing the reducible oxides comprising said pellets.

2. A process for making oxidation catalysts which comprises preparing a dry mixture of iron, magnesium, and chromium oxides, crushing the mixed oxides, moistening the crushed oxides with a solution of sodium silicate, forming the moistened oxides into shaped pellets, drying the pellets at temperatures between 500° and 725° C., and heating the pellets as rapidly as possible between the temperatures of 350° and 500° C. to avoid as far as possible subjecting the pellets to prolonged heating at temperatures between 350° and 500° C., and thereafter reducing the reducible oxides comprising said pellets at a temperature between about 550° and 725° C. with a reducing gas.

3. A process for making oxidation catalysts which includes the steps of preparing a dry mixture of about 25% to 35% FeO$_3$, the balance being principally MgO together with a small quantity of Cr$_2$O$_3$, crushing the mixed oxides, moistening the crushed oxides with a solution of sodium silicate, forming the moistened oxides into shaped pellets, drying the pellets at temperatures between 500° and 725° C., and heating the pellets as rapidly as possible between the temperatures of 350° and 500° C. to avoid as far as possible subjecting the pellets to prolonged heating at temperatures between 350° and 500° C., and thereafter reducing the reducible oxides comprising said pellets.

4. A process for making oxidation catalysts which includes the steps of preparing a dry mixture of about 25% to 35% of FeO$_3$, the balance being principally MgO together with a small quantity of Cr$_2$O$_3$, crushing the mixed oxides, moistening the crushed oxides with a solution of sodium silicate, forming the moistened oxides into shaped pellets, drying the pellets at temperatures between 500° and 725° C., and heating the pellets as rapidly as possible between the temperatures of 350° and 500° C. to avoid as far as possible subjecting the pellets to prolonged heating at temperatures of 350° to 500° C., and thereafter reducing the reducible oxides comprising said pellets at a temperature between about 550° and 725° C. with a reducing gas.

5. A process for preparing oxidation catalysts which includes the steps of forming a solution of ferric nitrate, maintaining said solution at a temperature below about 25° C. and adding thereto an excess of magnesium carbonate and a small quantity of potassium chromate, drying the resultant mixture, igniting the dried mixture to form oxides, crushing the oxides, moistening the crushed oxides with a solution containing sodium silicate equal to about 16% of the weight of crushed oxides, forming the moistened oxides into shaped pellets, drying the pellets at temperatures between 500° and 725° C., and heating the pellets as rapidly as possible between the temperatures of 350° and 500° C. to avoid as far as possible subjecting the pellets to prolonged heating at temperatures of 350° to 500° C., and thereafter reducing the reducible oxides comprising said pellets at a temperature about 550° C.

6. An oxidation catalyst in the form of hard, strong, coherent pellets adapted for use at elevated temperatures, being initially composed essentially of from about 25% to about 35% Fe$_2$O$_3$, about 55% to 65% MgO, and 1% of Cr$_2$O$_3$ and K$_2$O, said oxides being bonded in pellet form by means of a mineral binding agent which will permit active contact of said catalyst with a gas phase, and said pellets having been dried prior to reduction of said oxides at a temperature between about 500° and about 725° C., by heating said pellets as rapidly as possible through the temperature range of 350° to 500° C., to avoid as far as possible subjecting the pellets to prolonged heating in said temperature range.

7. An oxidation catalyst in the form of strong, hard, coherent pellets adapted for use at elevated temperatures, being initially composed essentially of from about 25% to about 35% Fe$_2$O$_3$, about 55% to 65% MgO, and about 1% of Cr$_2$O$_3$ and K$_2$O, said oxides being bonded in pellet form by means of a mineral binding agent comprising sodium silicate, and said pellets having been dried prior to reduction of said oxides at a temperature between about 500° and 725° C., by heating said pellets as rapidly as possible through the temperature range of 350° to 500° C. to avoid as far as possible subjecting the pellets to prolonged heating in said temperature range.

JAMES F. EVERSOLE.